United States Patent
Arnold et al.

(10) Patent No.: US 8,087,611 B2
(45) Date of Patent: Jan. 3, 2012

(54) GALLEY UNIT WITH CART LIFT FOR ELEVATED CART STORAGE

(75) Inventors: Geraldine Arnold, Winston-Salem, OR (US); Craig Cunningham, Old Northants (GB); Peter Burd, Carmarthenshire (GB); Mark Wayne Peurifoy, Winston-Salem, NC (US)

(73) Assignee: BE Aerospace, Inc., Wellington, FL (US)

( * ) Notice: Subject to any disclaimer, the term of this patent is extended or adjusted under 35 U.S.C. 154(b) by 780 days.

(21) Appl. No.: 11/951,659

(22) Filed: Dec. 6, 2007

(65) Prior Publication Data

US 2008/0136299 A1    Jun. 12, 2008

Related U.S. Application Data

(60) Provisional application No. 60/869,021, filed on Dec. 7, 2006.

(51) Int. Cl.
*B64D 11/04* (2006.01)
(52) U.S. Cl. .................. 244/118.1; 244/118.5
(58) Field of Classification Search ............... 244/118.1, 244/118.2, 118.5, 120; 186/40, 45, 47, 50, 186/51; 312/249.1, 249.8, 246, 247, 248, 312/310; 414/267, 659, 660, 661, 662
See application file for complete search history.

(56) References Cited

U.S. PATENT DOCUMENTS

| | | | |
|---|---|---|---|
| 3,854,616 A | 12/1974 | Willis et al. | |
| 4,022,404 A | 5/1977 | Greiss | |
| 4,055,317 A | 10/1977 | Greiss | |
| 5,618,149 A * | 4/1997 | Beaumont et al. | 414/253 |
| 5,755,337 A * | 5/1998 | Linn | 211/13.1 |
| 6,340,136 B1 * | 1/2002 | Luria | 244/118.5 |
| 6,357,806 B1 * | 3/2002 | Saku | 292/182 |
| 6,454,208 B1 * | 9/2002 | Nervig et al. | 244/118.5 |
| 6,464,169 B1 * | 10/2002 | Johnson et al. | 244/118.5 |
| 6,971,608 B2 * | 12/2005 | Harrington et al. | 244/118.5 |
| 2005/0133308 A1 | 6/2005 | Reysa et al. | |

FOREIGN PATENT DOCUMENTS

| | | |
|---|---|---|
| DE | 3106632 A1 | 9/1982 |
| DE | 202007004617 | 7/2007 |
| EP | 1174340 A2 | 1/2002 |
| WO | WO 2004097269 A2 * | 11/2004 |

* cited by examiner

*Primary Examiner* — Tien Dinh
*Assistant Examiner* — Richard R Green
(74) *Attorney, Agent, or Firm* — Shumaker, Loop & Kendrick LLP

(57) ABSTRACT

A galley unit with a cart lift is provided for elevated storage of a food and beverage cart. The galley unit includes a mounting rack configured for mounting at least one first galley component thereon. The cart lift includes a platform for supporting a second galley component thereon. The platform is movable between a fully lowered, fully extended position and a fully raised, fully retracted position with the second galley component supported thereon. A support pillar is positioned to one side of the mounting rack and is operable to support and manipulate the platform in a fore-and-aft motion between a fully extended position and a fully retracted position, and in an up-and-down motion between a fully lowered position and a fully raised position. The support pillar may include an operator controlled passive lifting system for assisting manipulation of the platform.

16 Claims, 5 Drawing Sheets

GALLEY UNIT WITH CART LIFT FOR ELEVATED CART STORAGE

CROSS-REFERENCE TO RELATED APPLICATION

This application claims the benefit of U.S. Provisional Application No. 60/869,021, filed Dec. 7, 2006.

TECHNICAL FIELD AND BACKGROUND OF THE INVENTION

This invention relates to equipment used for food preparation and storage in a passenger vehicle. More particularly, this invention relates to a galley unit for a passenger vehicle with a cart lift for elevated storage of a food and beverage cart.

Many passenger vehicles, such as trains, buses, and aircraft, include one or more galley units for storing and preparing food. These galley units are often configured to store one or more wheeled carts used for transporting food and beverages to passengers seated within the vehicle. In some instances it is desirable to store food and beverage carts above floor level to thereby increase the amount of available storage space within a limited floor area. It may also be required for safety purposes to securely store any excess food and beverage carts within a galley unit during certain vehicle operations, such as taxi, take-off and landing of an aircraft. Such carts, however, are oftentimes awkwardly shaped and generally too heavy for a typical person to manually lift the cart into an elevated storage position without compromising the safety of the passengers or damaging the galley unit.

As a result, there exists a need for a galley unit for a passenger vehicle with a cart lift for elevated storage of a food and beverage cart. There exists a further, and more specific, need for a galley unit which allows such carts to be readily stored and easily retrieved from an elevated storage position without endangering passengers or damaging the galley unit.

SUMMARY OF THE INVENTION

The above-mentioned needs are met by the present invention, which provides a galley unit with a cart lift for elevated storage of a food and beverage cart. In one aspect, the invention is a galley unit for a passenger vehicle including a mounting rack configured for mounting at least one first galley component thereon and a cart lift including a platform for supporting a second galley component thereon. The platform is operably attached to the mounting rack and movable relative to the mounting rack between a fully lowered, fully extended position and a fully raised, fully retracted position.

In another aspect, the galley unit further includes a support pillar positioned to one side of the mounting rack. The support pillar is operable to support and manipulate the platform of the cart lift in a fore-and-aft motion between a fully extended position and a fully retracted position, and in an up-and-down motion between a fully lowered position and a fully raised position. Preferably, the second galley component is disposed between the at least one first galley component and the support pillar.

In another aspect, at least the up-and-down motion of the platform is assisted by an operator controlled passive lifting system. Preferably, the passive lifting system is selected from the group consisting of a gas cylinder, a hydraulic cylinder and a pneumatic cylinder. Regardless, the platform has neutral buoyancy and may be moved in the up-and-down motion using only a relatively small amount of manual force transmitted through a movable handle. The handle may be configured to further lock and unlock the passive lifting system from movement.

In another aspect, the present invention provides a galley unit for a passenger vehicle configured for elevated storage of a food and beverage cart. The galley unit includes a cart lift for lifting the food and beverage cart from a lowered use position adjacent a floor of the passenger vehicle to an elevated storage position for storing the food and beverage cart on the galley unit.

In another aspect, the galley unit further includes a mounting rack for receiving the food and beverage cart in the elevated storage position and a support pillar adjacent the mounting rack. The support pillar is operable to support and manipulate the cart lift between the lowered use position and the elevated storage position. The cart lift includes a platform movably attached to the support pillar for receiving and supporting the food and beverage cart thereon.

In another aspect, the support pillar comprises an operator controlled passive lifting system for assisting manipulation of the cart lift. The passive lifting system is selected from the group consisting of a gas cylinder, a hydraulic cylinder and a pneumatic cylinder such that the cart lift has neutral buoyancy and may be manipulated using only manual force. Preferably, the food and beverage cart is disposed between the support pillar and the mounting rack.

In another aspect, the present invention provides a method for storing a galley component on a gallery unit of a passenger vehicle comprising a mounting rack for mounting the galley component and a cart lift for supporting and lifting the galley component to an elevated storage position on the mounting rack. The method includes positioning the cart lift in a fully lowered, fully extended position adjacent a floor of the passenger vehicle. The method further includes positioning and supporting the galley component on the cart lift. The method further includes raising the cart lift and the galley component supported thereon to a fully raised, fully extended position on the mounting rack. The method further includes retracting the cart lift and the galley component supported thereon to a fully raised, fully retracted position on the mounting rack.

BRIEF DESCRIPTION OF THE DRAWINGS

The present invention may be best understood by reference to the following description when taken in conjunction with the accompanying drawing figures.

DESCRIPTION OF THE PREFERRED EMBODIMENTS AND BEST MODE

Figure 1:
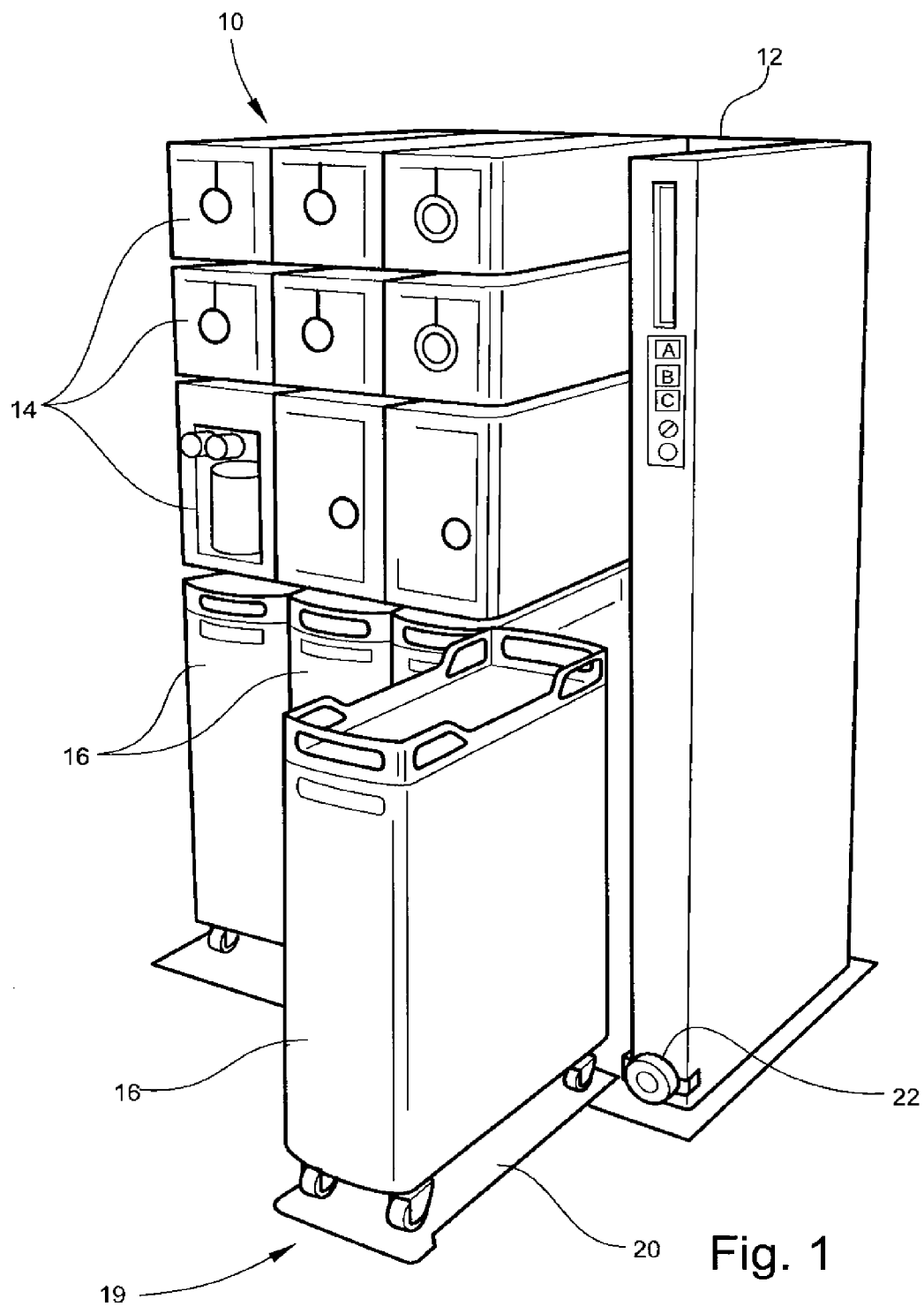
FIG. 1 is a front perspective view of a galley unit constructed according to one aspect of the invention shown with a cart lift in a fully lowered, fully extended position.
Figure 2:
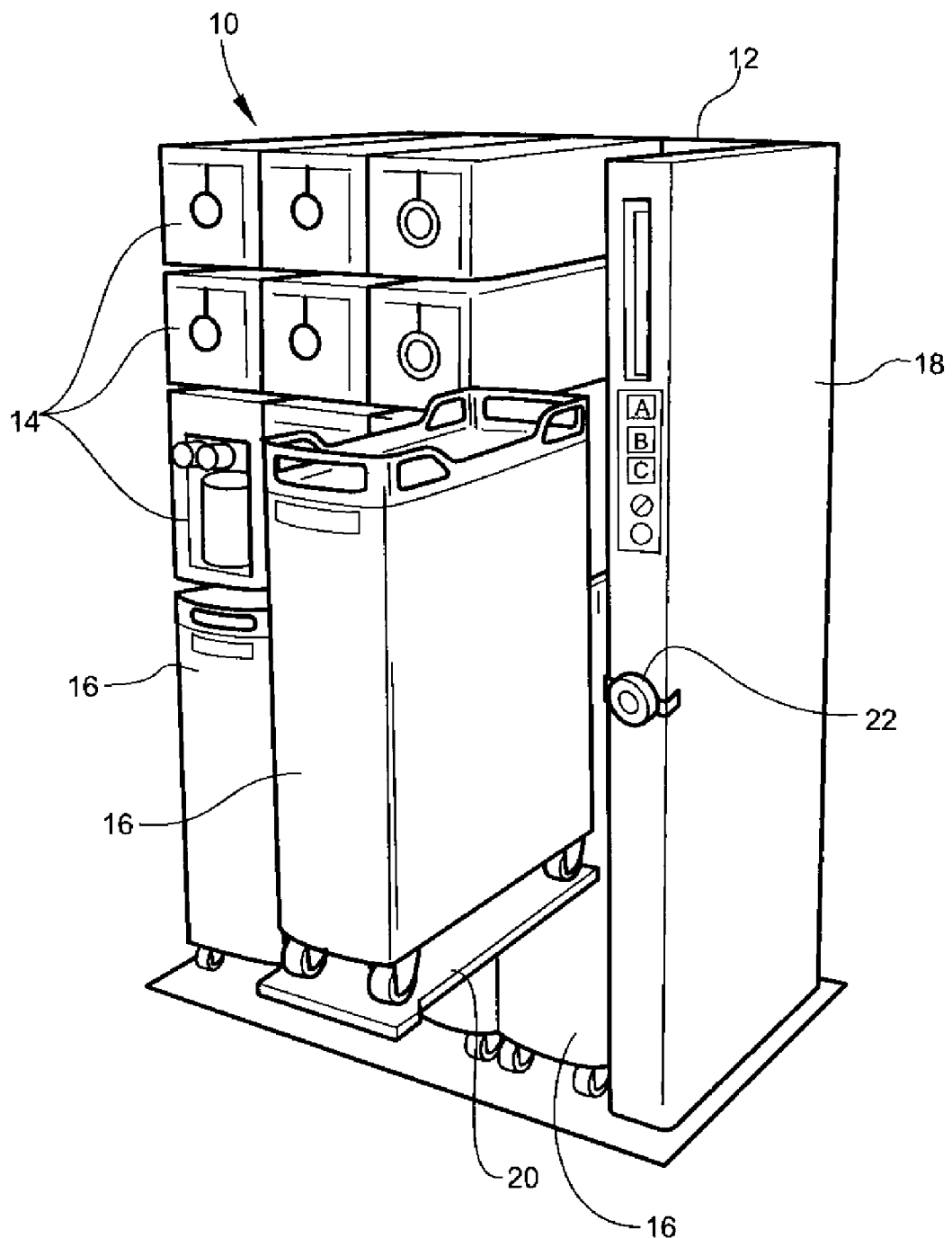
FIG. 2 is a front perspective view of the galley unit of FIG. 1 with the cart lift shown in a partially raised, fully extended position.
Figure 3:
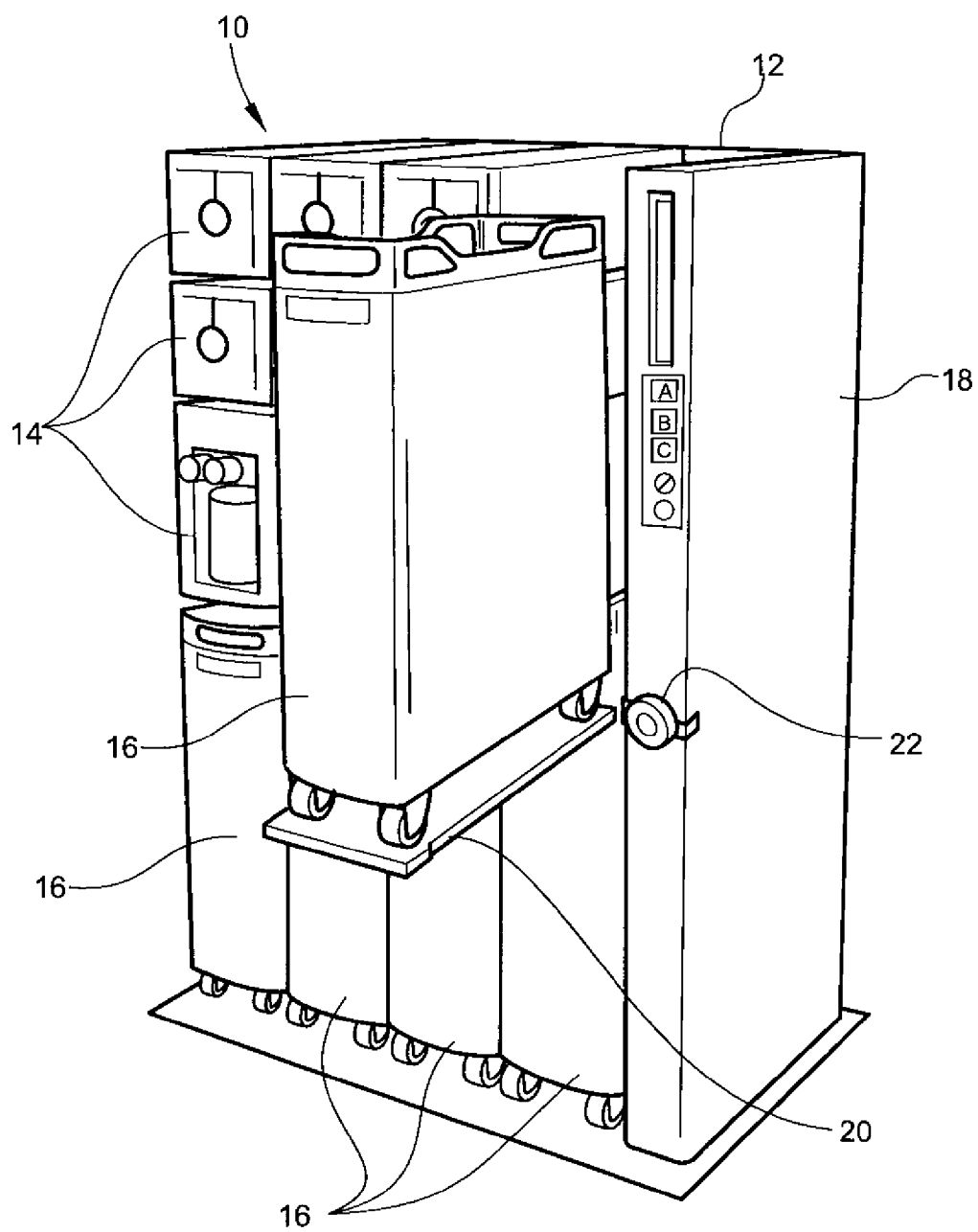
FIG. 3 is a front perspective view of the galley unit of FIG. 1 with the cart lift shown in a further partially raised, fully extended position.
Figure 4:
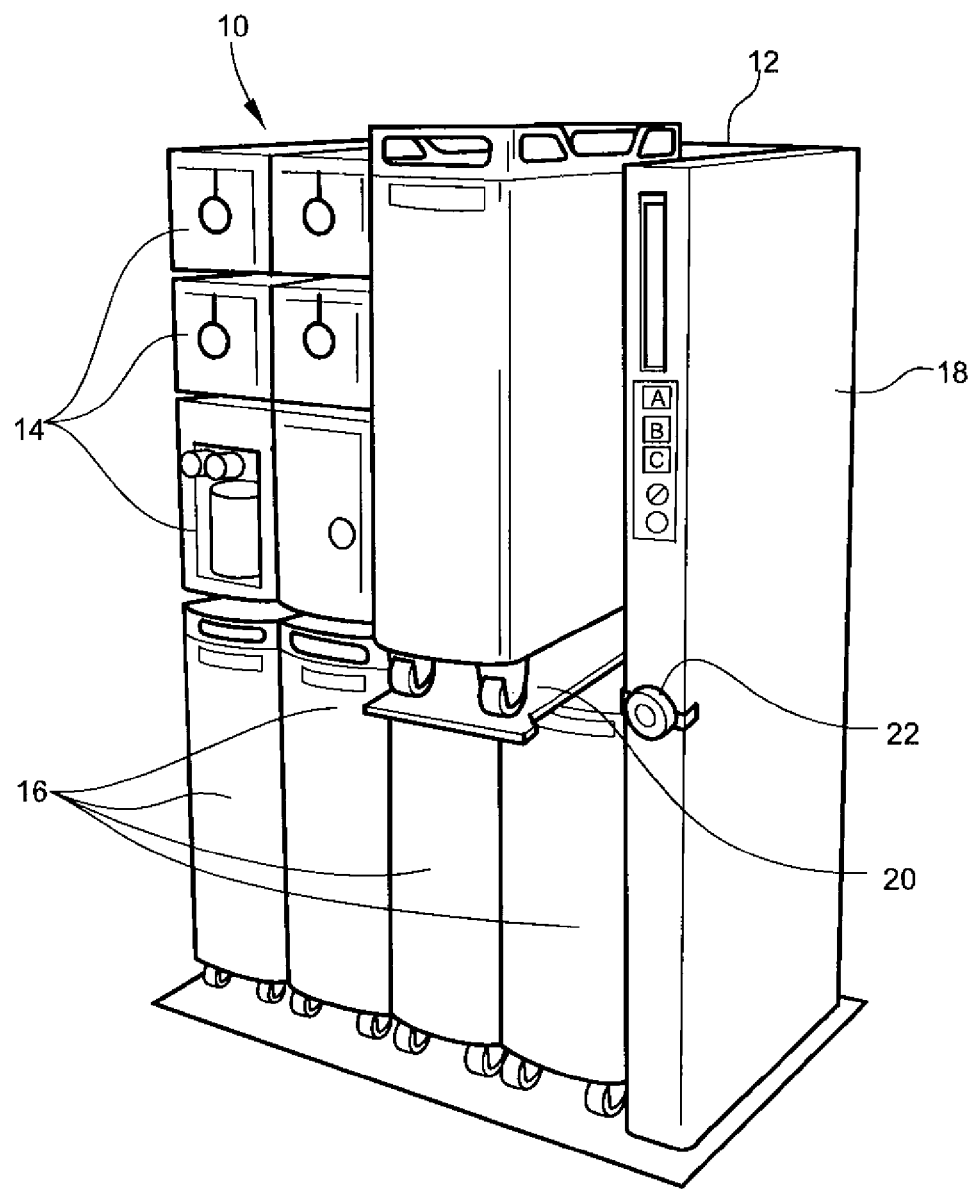
FIG. 4 is a front perspective view of the galley unit of FIG. 1 with the cart lift shown in a fully raised, partially retracted position.

Referring now specifically to the drawing figures wherein like reference numerals denote the same or essentially identical elements throughout the various views, an exemplary embodiment of a galley unit 10 constructed according to one aspect of the present invention is illustrated in FIG. 1. The galley unit 10 comprises an upright structural support or mounting rack 12 configured for mounting a plurality of first galley components 14, such as storage containers, beverage dispensers, ovens, and the like, oftentimes collectively referred to as "galley modules." One or more second galley components 16, such as wheeled carts used to store and serve food and beverages are positioned on the floor of a passenger vehicle beneath the first galley components 14. As used herein, the term "food and beverage cart" is used broadly and is intended to include any movable cart of the type typically used within a passenger vehicle to provide refreshments, such as food or beverages, or other items, such as towels, blankets, pillows, magazines, newspapers, books, etc., to passengers for the purpose of increasing comfort and/or safety. A well known example is the food and beverage cart 16 shown and described herein commonly used to store and deliver refreshments to passengers aboard a commercial aircraft.

The galley unit 10 also comprises an upright support pillar 18 positioned on the mounting rack 12 to one side of the first galley components 14. The support pillar 18 is operable to support and manipulate a cart lift 19 comprising a platform 20 sized to carry at least one food and beverage cart 16 thereon. The platform 20 is physically supported by the support pillar 18 and/or other portions of the galley unit 10, for example tracks, braces, levers or bars (not shown), such that it can move between a fully extended position and a fully retracted position relative to the mounting rack 12 of the galley unit 10 (i.e. fore-and-aft motion), and also between a fully lowered position and a fully raised position (i.e. up-and-down motion). Means may be provided on the support pillar 18 for latching or locking the platform 20 in any convenient position, including a fully extended, fully lowered position; a fully raised, fully retracted position; or any desired position therebetween.

In a preferred embodiment, at least the up-and-down motion of the platform 20 is assisted by an operator controlled passive lifting system. A suitable passive lifting system may include a spring-biased or pressure-biased gas, hydraulic, or pneumatic cylinder (not shown), such as those sold under the trade name HYDROLOK, connected to the platform 20 and sized to counterbalance the weight of the platform 20 and the food and beverage cart 16. In this case, the platform 20 has "neutral buoyancy" and may be moved in the up-and-down using only a relatively small amount of manual force, which may be transmitted through a movable handle 22. Handle 22 may also be configured to lock and unlock the passive lifting system from movement in a conventional manner. Alternatively, a full power system using electrical, hydraulic, or mechanical actuators may be used to move and/or unlock and lock the platform 20.

A food and beverage cart 16 is loaded into the galley unit 10 as illustrated in FIGS. 1-4 and described herein. The platform 20 of the cart lift 19 is first moved to a fully lowered, fully extended position shown in FIG. 1. The cart 16 is then rolled onto the platform, and if desired, secured thereon in a suitable manner. The platform 20 is then lifted (i.e. raised), either under full power or by assisted manual action, through the partially raised, fully extended positions shown in FIG. 2 and FIG. 3 until the cart 16 and platform 20 reach the fully raised position shown in FIG. 4. The fully raised position is sufficiently high above the floor of the vehicle to conveniently store the cart 16 on the galley unit 10. Platform 20 with the cart 16 thereon is then moved backwards from the partially retracted position shown in FIG. 4 to a fully retracted position so that the front vertical face of the cart is substantially flush with the remainder of the galley unit 10. The above described procedure is reversed to retrieve (i.e. unload) the cart 16 from the galley unit 10 and deliver the cart to the floor of the vehicle.

Figure 5:
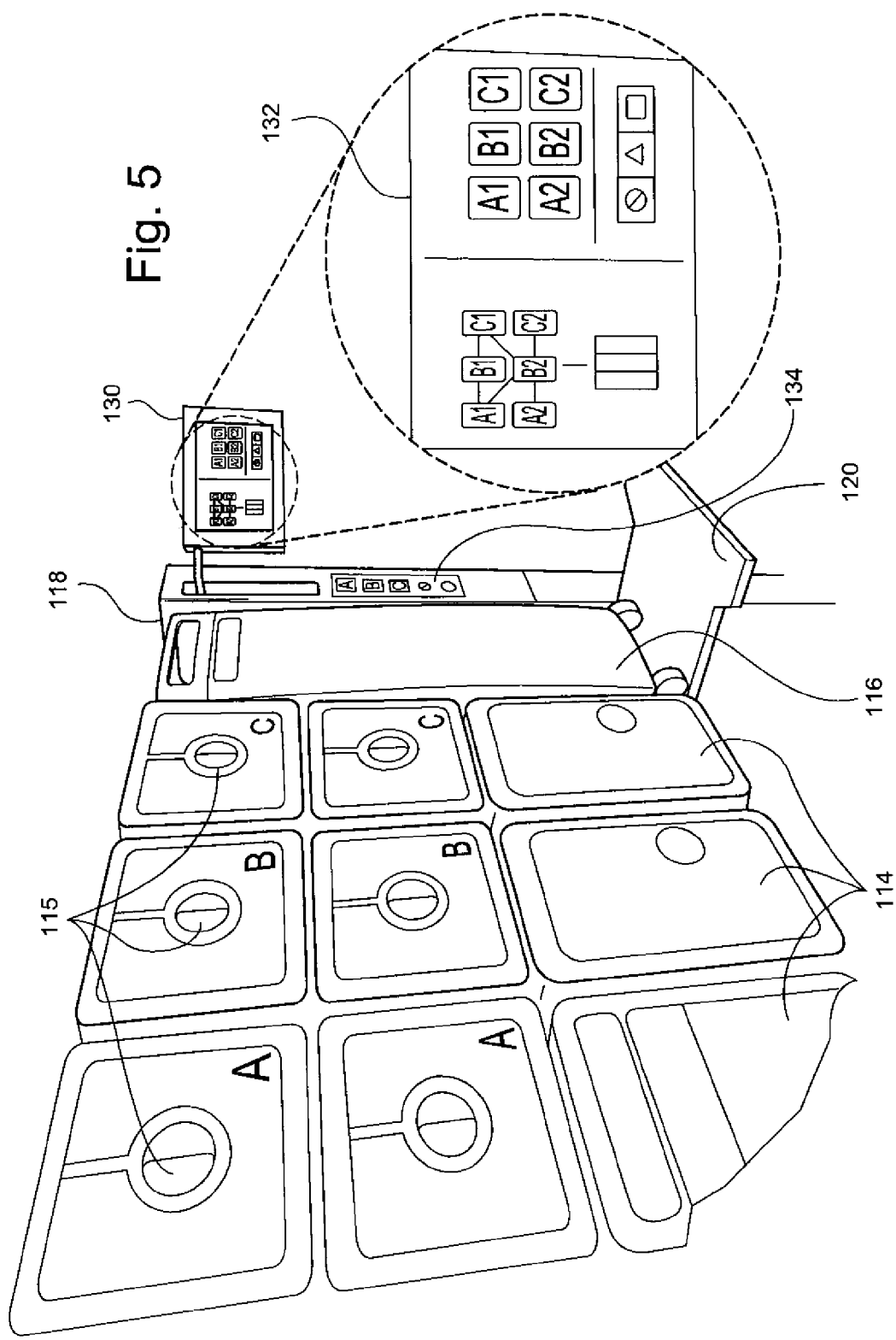
FIG. 5 is front perspective view of a galley unit constructed according to another aspect of the invention showing a plurality of galley modules color-coded with a graphical user interface (GUI).

An exemplary embodiment of a galley unit 100 constructed according to another aspect of the present invention is illustrated in FIG. 5. The galley unit 100 comprises an upright structural support or mounting rack configured for mounting a plurality of first galley components 114, such as storage containers, beverage dispensers, ovens, and the like, oftentimes collectively referred to as "galley modules." One or more second galley components 116, such as wheeled carts used to store and serve food and beverages are positioned on the floor of a passenger vehicle beneath the first galley components 114. As shown, one of the food and beverage carts 116 is raised, lowered, retracted and extended on a platform 120 supported by a support pillar 118, as previously described. The galley unit 100 further comprises an electronic graphical user interface (GUI) 130 having a conventional touch screen 132 for storing and displaying information relating to the galley modules 114. For example, the GUI 130 may store and display information relating to the contents of the galley modules 114 and the location of a particular galley module on the galley unit 100.

In a preferred embodiment, each of the galley modules 114 is color-coded with the touch screen 132 of the GUI 130. For example, the galley modules 114 indicated by the reference character A in FIG. 5 may be color-coded red. Similarly, the galley modules 114 indicated by B may be color-coded blue and the galley modules 114 indicated by C may be color-coded yellow. The touch screen 132 is likewise color-coded and electrically coupled to the galley modules 114 with electronic sensors. In addition, the touch screen 132 may include a numeric identifier, such as "1" and "2," for indicating the vertical location of the galley modules 114. These features allow aircraft personnel to visually identify the galley module 114 that corresponds to particular information depicted on the touch screen 132 of the GUI 130. The color-coded GUI 130 may also be used to actuate an automated system 134 for stowing and retrieving galley modules 114 from the galley unit 110.

The galley modules 114 may be color-coded in any convenient manner. However in preferred embodiments, each galley module 114 is color-coded at least around the door latch 115, as depicted in FIG. 5. Furthermore, the galley modules 114 are arranged with each color-coded galley module A, B, C vertically aligned with one or more like color-coded galley modules. In addition, the second galley components 116 (e.g. food and beverage carts) may be color-coded in the same manner. As shown, the door latches 115 are generally round and have a "D-shaped" recessed portion that allows aircraft personnel to readily grasp the door latch to open the galley module 114 without encountering a sharp edge. As a result, the contents of the galley module 114 can be accessed quickly and safely. As will be readily appreciated by those skilled in the art, the galley unit 100 comprises a novel arrangement of design elements, including lines, colors, contours, shapes, massing and proportions, that produce an overall aesthetic appearance and function in a cohesive design.

A galley unit provided with a cart lift for elevated storage of a food and beverage cart has been shown and described herein. The galley unit may further include galley modules that are color-coded with a graphical user interface (GUI) for visual identification of a galley module corresponding to information depicted on the GUI. Various details of the invention may be altered without departing from its intended scope.

Furthermore, the foregoing description of the preferred embodiments of the invention and the best mode for practicing the invention are provided for the purpose of illustration only and not for the purpose of limitation.

That which is claimed is:

1. A galley unit for a passenger vehicle, comprising:
   a mounting rack configured for mounting at least one first galley component thereon;
   a cart lift including a platform supporting a second galley component thereon, the platform movable relative to the mounting rack between a fully lowered, fully extended position and a fully raised, fully retracted position; and
   a support pillar positioned to one side of the mounting rack and the platform, the support pillar housing a lift mechanism physically supporting the platform of the cart lift in a fore-and-aft motion between the fully extended position and the fully retracted position, and in an up-and-down motion between the fully lowered position and the fully raised position, wherein the platforms has neutral buoyancy and may be moved in the up-and-down motion using only a relatively small amount of manual force.

2. The galley unit according to claim 1, wherein the second galley component is disposed between the at least one first galley component and the support pillar.

3. The galley unit according to claim 1, wherein at least the up-and-down motion of the platform is assisted by the operator controlled lifting system.

4. The galley unit according to claim 1, wherein the lifting system is selected from the group consisting of a gas cylinder, a hydraulic cylinder and a pneumatic cylinder.

5. The galley unit according to claim 1, wherein the platform may be moved in the up-and-down motion using a movable handle.

6. The galley unit according to claim 5 wherein the handle is configured to further lock and unlock the lifting system from movement.

7. The galley unit according to claim 1, wherein the first galley component is selected from the group consisting of a storage container, a beverage dispenser and an oven.

8. The galley unit according to claim 1, wherein the second galley component is a food and beverage cart.

9. A galley unit for a passenger vehicle configured for elevated storage of a food and beverage cart, the galley unit comprising:
   a mounting rack for receiving the food and beverage cart in an elevated storage position;
   a cart lift for lifting the food and beverage cart from a lowered use position adjacent a floor of the passenger vehicle to an elevated storage position for storing the food and beverage cart on the galley unit, the cart lift comprising a platform physically supported by a lift mechanism housed within a support pillar positioned to one side of the platform and the mounting rack, the platform movable in vertical and horizontal directions, wherein the platform has neutral buoyancy and may be moved in the up-and-down motion using only a relatively small amount of manual force.

10. The galley unit according to claim 9, wherein the lifting system is selected from the group consisting of a gas cylinder, a hydraulic cylinder and a pneumatic cylinder.

11. The galley unit according to claim 9, wherein the food and beverage cart is disposed between the support pillar and the mounting rack.

12. The galley unit according to claim 9, further comprising a graphical user interface (GUI) for depicting information relating to the galley unit and wherein at least one first galley component is color-coded with the GUI so that a user can visually identify the first galley component corresponding to the information depicted on the GUI.

13. The galley unit according to claim 12, wherein a plurality of first galley components are color-coded and arranged in vertical alignment.

14. The galley unit according to claim 12, wherein the at least one first galley component comprises a generally round door latch and wherein the door latch is color-coded with the GUI.

15. The galley unit according to claim 12, wherein at least one second galley component is color-coded with the at least one first galley component and is arranged in vertical alignment therewith.

16. A method for storing a galley component on a galley unit of a passenger vehicle comprising a mounting rack for mounting the galley component and a cart lift for supporting and lifting the galley component to an elevated storage position on the mounting rack, the method comprising:
   providing a galley unit comprising a mounting rack, a cart lift including a platform movable relative to the mounting rack between a fully lowered, fully extended position and a fully raised, fully retracted position, and a support pillar positioned to one side of the mounting rack and the platform, the support pillar housing a lift mechanism physically supporting the platform in a fore-and-aft motion between the fully extended position and the fully retracted position, and in an up-and-down motion between the fully lowered position and the fully raised position wherein the platform has natural buoyancy and may be moved in the up-and-down motion using only a relatively small amount of manual force;
   positioning the platform in a fully lowered, fully extended position adjacent a floor of the passenger vehicle;
   positioning and supporting the galley component on the platform;
   raising the platform and the galley component supported thereon to a fully raised, fully extended position on the mounting rack; and
   retracting the platform and the galley component supported thereon to a fully raised, fully retracted position on the mounting rack.

\* \* \* \* \*